US007616288B2

(12) United States Patent  (10) Patent No.: US 7,616,288 B2
Motomatsu  (45) Date of Patent: Nov. 10, 2009

(54) METHOD OF MANUFACTURING LIQUID CRYSTAL DISPLAY DEVICE WITH REMOVAL OF CONTAMINANTS AFTER CLEANING AND DRYING

(75) Inventor: Toshihiko Motomatsu, Kanagawa (JP)

(73) Assignee: NEC LCD Technologies, Ltd, Kanagawa (JP)

( * ) Notice: Subject to any disclaimer, the term of this patent is extended or adjusted under 35 U.S.C. 154(b) by 569 days.

(21) Appl. No.: 11/037,045

(22) Filed: Jan. 19, 2005

(65) Prior Publication Data
US 2005/0157246 A1     Jul. 21, 2005

(30) Foreign Application Priority Data
Jan. 19, 2004 (JP) .............................. 2004/10017

(51) Int. Cl.
 G02F 1/13      (2006.01)
 G02F 1/1337    (2006.01)
 G02F 1/1339    (2006.01)
(52) U.S. Cl. ................. 349/187; 349/123; 349/126; 349/155
(58) Field of Classification Search ................ 349/187
 See application file for complete search history.

(56) References Cited

U.S. PATENT DOCUMENTS

| 5,898,041 | A | * | 4/1999 | Yamada et al. ............... 522/81 |
| 6,118,511 | A | * | 9/2000 | Ohno et al. ................... 349/158 |
| 2001/0002858 | A1 | * | 6/2001 | Kageyama et al. ........... 349/158 |
| 2003/0223030 | A1 | * | 12/2003 | Byun et al. .................. 349/187 |

FOREIGN PATENT DOCUMENTS

| CN | 1314606 A | 9/2001 |
| CN | 1461961 A | 12/2003 |
| JP | 2-236520 A | 9/1990 |
| JP | 6-324340 A | 11/1994 |
| JP | 9-5759 A | 1/1997 |
| JP | 2000-66162 A | 3/2000 |
| JP | 2000-107715 A | 4/2000 |
| JP | 2000-284249 A | 10/2000 |
| JP | 2001-356354 A | 12/2001 |
| JP | 2002-318378 A | 10/2002 |
| JP | 2003-90988 A | 3/2003 |

OTHER PUBLICATIONS

Machine translation of JP 2000-284249.*
Machine translation of JP 2000-107715.*
Machine translation of JP 2003-090988.*
Machine translation of JP 2001-356354.*

* cited by examiner

Primary Examiner—Andrew Schechter
(74) Attorney, Agent, or Firm—Sughrue Mion, PLLC

(57) ABSTRACT

Disclosed is a method of manufacturing a liquid crystal display device using a liquid crystal dispensation alignment method which includes steps of: removing inorganic ions and the like by performing a vacuum drying process on substrates after cleaning alignment layers on which a rubbing process has been performed; and removing foreign objects by performing any one of a process for sucking up foreign objects by use of a nozzle having a specialized shape and a process for blasting a gas to which ultrasonic waves have been applied against the foreign objects, before liquid crystal is dispensed. In addition, a temperature at which sealing material is cured completely is lowered in order to inhibit activation (migration) of organic matters and to thereby reduce visible defects such as alignment bright defects.

2 Claims, 9 Drawing Sheets

|  | NUMBER OF DEFECTS TO BE CAUSED IN ONE PANEL |
|---|---|
| SUCTION PROCESS PERFORMED | 4.4 |
| NO SUCTION PROCESS PERFORMED | 8.3 |

Fig. 9

| PROCESS CONDITIONS | NUMBER OF PANELS TO BE INSPECTED | NUMBER OF VISIBLE DEFECTS TO BE CAUSED | | | |
|---|---|---|---|---|---|
| | | NUMBER OF PANELS IN WHICH DEFECTS WERE CAUSED | RATE OF DEFECTS | NUMBER OF DEFECTS WHICH WERE CAUSED | AVERAGE OF DEFECTS WHICH WERE CAUSED IN ONE PANEL |
| NO PROCESS | 6 | 4 | 66.7% | 7 | 1.2 |
| HEATING ONLY | 6 | 3 | 50% | 3 | 0.5 |
| VACUUM DRYING | 5 | 2 | 40% | 2 | 0.4 |

Fig. 10

| CONDITIONS FOR HARDENING | NUMBER OF PANELS TO BE INSPECTED | NUMBER OF VISIBLE DEFECTS TO BE CAUSED | | | |
|---|---|---|---|---|---|
| | | NUMBER OF PANELS IN WHICH DEFECTS WERE CAUSED | RATE OF DEFECTS | NUMBER OF DEFECTS WHICH WERE CAUSED | AVERAGE OF DEFECTS WHICH WERE CAUSED IN ONE PANEL |
| 80°C-150MINUTES | 10 | 0 | 0% | 0 | 0 |
| 80°C-240MINUTES | 7 | 0 | 0% | 0 | 0 |
| 90°C-150MINUTES | 7 | 1 | 14% | 1 | 0.1 |
| 100°C-150MINUTES | 7 | 6 | 86% | 7 | 1.0 |
| 110°C-150MINUTES | 7 | 6 | 86% | 12 | 1.7 |
| 125°C-90MINUTES | 5 | 3 | 60% | 4 | 0.8 |

Fig. 11

| SAMPLE NUMBER | SEALING MATERIAL CURED AT 80°C FOR 8 HOURS | | SEALING MATERIAL CURED AT 125°C FOR 1.5 HOURS | |
|---|---|---|---|---|
| | NO VACUUM DRYING PROCESS PERFORMED | VACUUM DRYING PROCESS PERFORMED | NO VACUUM DRYING PROCESS PERFORMED | VACUUM DRYING PROCESS PERFORMED |
| SAMPLE 1 | 0/8 | | 30/30 | |
| SAMPLE 2 | 0/17 | | 3/5 | |
| SAMPLE 3 | 0/19 | | | |
| SAMPLE 4 | 0/35 | | | |
| SAMPLE 5 | 0/42 | | | |
| SAMPLE 6 | 0/24 | 0/4 | 2/2 | 0/6 |
| SAMPLE 7 | | 0/6 | | 18/28 |
| SAMPLE 8 | | 0/13 | | 12/28 |
| NUMBER OF PANELS IN WITCH DEFECTS | 0/145 | 0/23 | 35/37 | 30/62 |
| TOTAL NUMBER OF PANELS IN WHICH DEFECTS WERE CAUSED | 0/168 | | 65/99 | |

METHOD OF MANUFACTURING LIQUID CRYSTAL DISPLAY DEVICE WITH REMOVAL OF CONTAMINANTS AFTER CLEANING AND DRYING

BACKGROUND OF THE INVENTION

1. Field of the Invention

The present invention relates to a method of manufacturing a liquid crystal display device, and particularly to a method of manufacturing a liquid crystal display device using a normal-pressure dispensation alignment method.

2. Description of the Prior Art

As a display device of an audio-visual machine and an office automation machine, a liquid crystal display device (LCD) has been widely used because of its merits including thin thickness, a light weight, a low power consumption and the like. With this liquid crystal display device (hereinafter abbreviated to "LCD"), liquid crystal is filled into a gap between a pair of substrates which face each other. An electric field made of electrodes provided onto each of the substrates controls the alignment direction of liquid crystal molecules, and thereby modulating beams of light which are irradiated onto the LCD. Thus, the LCD displays an image.

As methods for filling liquid crystal into the LCD, the following methods have been generally known.

According to a first conventional method of filling liquid crystal, first of all, substrates facing each other are aligned with sealing material except for an area which are assigned as a port through which liquid crystal is filled (hereinafter, the port will be referred to as a "filling port"). Subsequently, the aligned substrates are placed into a vacuum container so that the aligned substrates are put under a low pressure condition. Thereafter, the pressure in the vacuum container is returned to an atmospheric pressure while the filling port remains to be soaked in liquid crystal. This is what is called a method employing difference in pressure.

According to a second conventional method of filling liquid crystal, substrates facing each other are aligned with sealing material except for areas which are assigned as a filling port and a port through which air is exhausted (hereinafter, a latter port will be referred to as an "exhausting port"). Thereafter, the filling port is soaked into liquid crystal, and air is exhausted through the exhausting port, and thereby liquid crystal is sucked up thereinto.

According to a third conventional method of filling liquid crystal, in an atmosphere whose pressure has been reduced by a vacuum container or the like, sealing material is coated, and liquid crystal is dispensed, on one of the two substrates, and thereafter the other of the two substrates is aligned thereon. Subsequently, the pressure under which the substrates are being placed is returned to the atmospheric pressure so that the sealing material is cured (hereinafter, this method will be referred to as a "vacuum dispensation alignment method." See Japanese Patent Laid-open Official Gazette No. 2002-318378, for example).

According to a fourth conventional method of filling liquid crystal, in the atmospheric pressure, sealing material is coated, and liquid crystal is dispensed, on one of the two substrates, and thereafter the other of the two substrates is aligned thereon. Subsequently, the sealing material is cured while the pressure is being increased (hereinafter, this method will be referred to as a "normal-pressure dispensation alignment method").

The methods for filling liquid crystal by use of difference in pressure or exhaustion require a filling port to be sealed with resin or the like after liquid crystal is filled. Accordingly, this brings about problems that bubbles are mixed into the liquid crystal through the filling port, and that liquid crystal is contaminated with the sealing material.

The vacuum dispensation alignment method can reduce time needed for filling liquid crystal to a large extent, and can reduce an amount of valuable liquid crystal needed for manufacturing in comparison with the methods for filling liquid crystal. However, larger facilities are required for performing a process of dispensing liquid crystal, and a process of aligning substrates, under a low pressure condition. In addition, the vacuum dispensation alignment method brings about a problem of deterioration in reliability of an LCD for the following reason and the like. Dispensed liquid crystal spreads so rapidly that the liquid crystal comes into contact with the sealing material before the sealing material has dried up. Accordingly, ingredient materials of the sealing material are dissolved into the liquid crystal. By contrast, the normal-pressure dispensation alignment does not require a pair of substrates to be maintained under a low pressure condition, thereby enabling the manufacturing facilities to be simplified. In addition, the spread of the liquid crystal can be controlled easily, and can be checked visually. Accordingly, the normal-pressure dispensation method has a feature of better workability.

Here, descriptions will be provided for the conventional normal-pressure dispensation alignment method with reference to FIGS. 1, and 2A to 2G.

Figure 1:
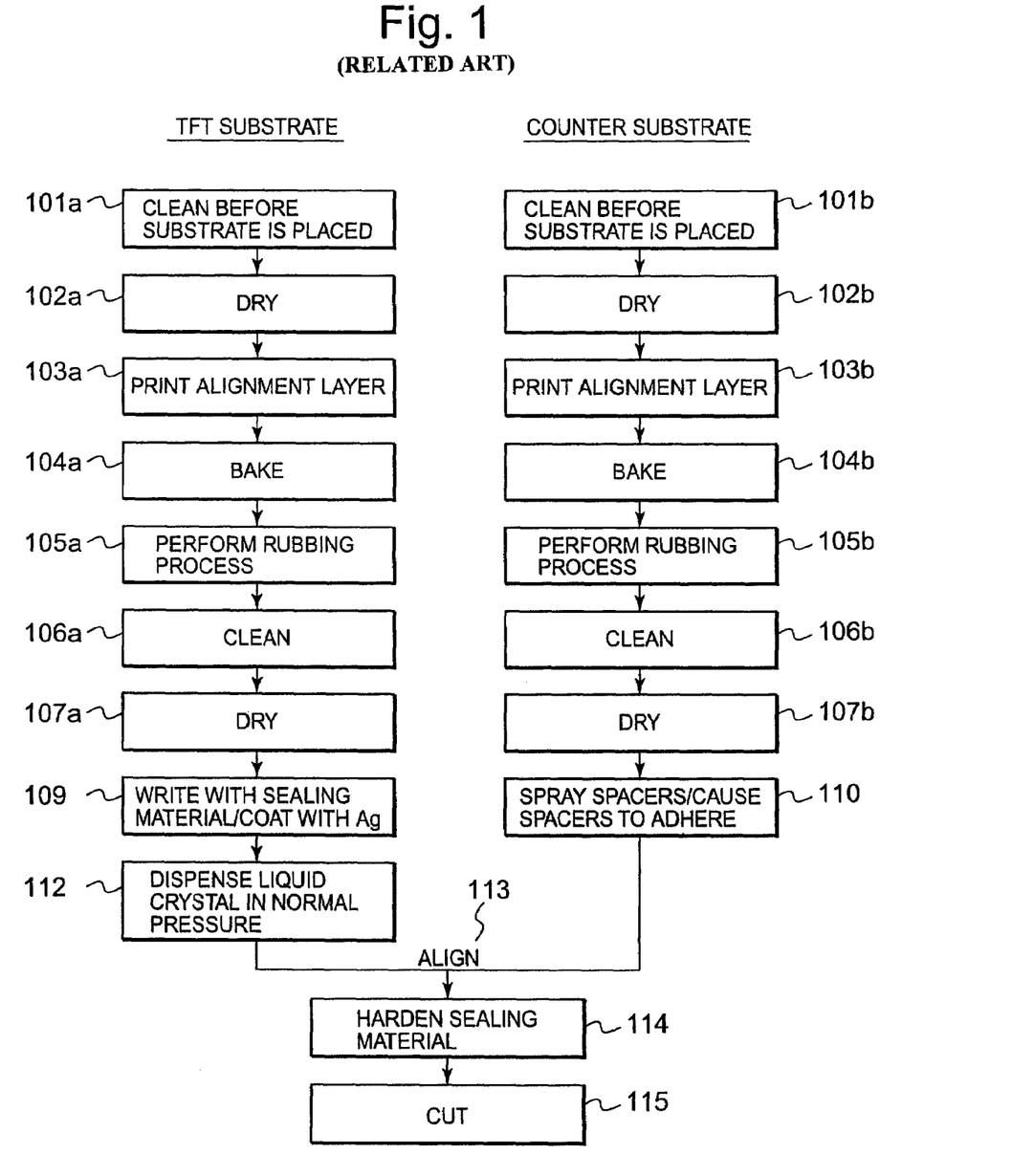
FIG. 1 is a flowchart showing parts of steps of manufacturing an LCD according to a conventional normal-pressure dispensation alignment method.

FIG. 1 is a flowchart showing parts of a method of manufacturing an LCD using the conventional normal-pressure dispensation alignment method. FIGS. 2A to 2G illustrate a cross-sectional process flow schematically showing a structure of the substrate.

First of all, a TFT substrate 2 and a counter substrate 3 are prepared. On the TFT substrate 2, switching elements such as Thin Film Transistors (TFTs) have been formed. On the counter substrate 3, color filters, black matrixes and the like have been formed. Before alignment layers 4 are formed respectively on the TFT substrate and the counter substrate, wet cleaning by use of detergent, an organic solvent, pure water and the like as well as dry cleaning by use of ultraviolet radiation (101a and 101b) are performed on both the TFT substrate and the counter substrate. After these cleanings, the substrates are dried up by use of a hot plate, an IR heating machine and the like (102a and 102b).

Figure 2A:
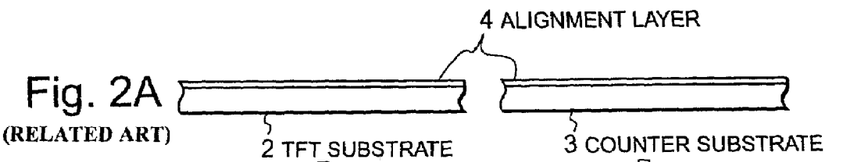
FIGS. 2A to 2G illustrate a cross-sectional process flow showing structures of the respective substrates which are processed by use of the conventional normal-pressure dispensation alignment method.

Subsequently, the surfaces of the respective substrates are coated with a polyimide solution which is material for alignment layers 4 by use of a printing machine (103a and 103b). Thereafter, the substrates are temporarily baked at a temperature of around 80° C. by use of a hot plate, an IR heating machine or the like. Then, complete baking for shrinking the layers coated with a polyimide solution by heating to be dehydrated is performed (104a and 104b) so that the alignment layers 4 are formed with an even thickness (as shown in FIG. 2A).

Figure 2B:
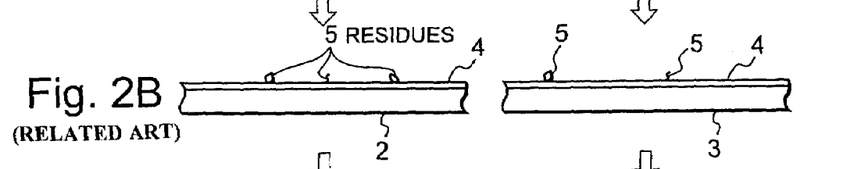

Subsequently, for the purpose of controlling an alignment direction of the liquid crystal, rubbing processes are performed respectively on the surfaces of the respective post-baked alignment layers 4 in a way that the surfaces of the respective post-baked alignment layers 4 are rubbed in one direction only by use of buff cloth which has been rolled up around a rotating metallic rollers (105a and 105b). In this occasion, as shown in FIG. 2B, residues 5 such as waste pieces of thread of the buff cloth and shavings of the alignment layers 4 stick to the surfaces of the respective substrates.

Figure 2C:
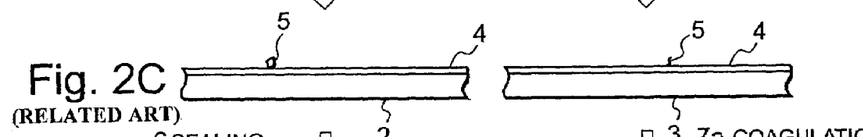

Then, in order to remove the residues 5 from the surfaces of the respective substrates, the substrates are cleaned by an ultrasonic cleaning method, a jet spray method or the like, those of which use hot ultra pure water and alcohol and the like (106a and 106b). With regard to these cleaning steps, restrictions are imposed on the cleaning methods in order to avoid damaging the alignment direction of the alignment layers. For this reason, residues 5 which have been unable to be removed may remain on the surfaces of the respective substrates in some cases (as shown in FIG. 2C). Subsequently, the substrates are put into a drying furnace so that the substrates are dried up by hot air circulation, an IR heating machine or the like (107a and 107b).

Figures 2D, 2E:
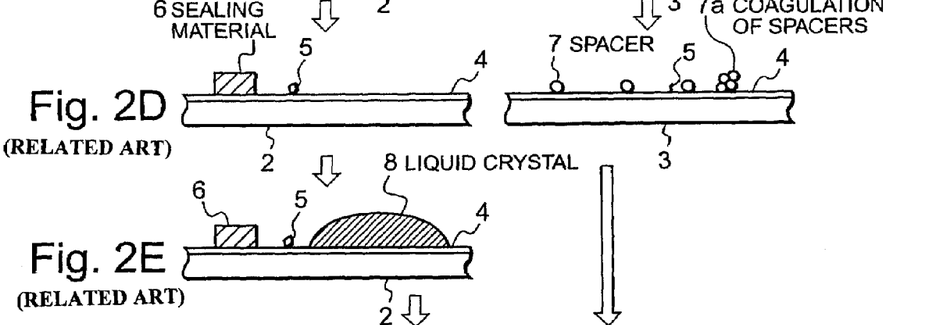

Thereafter, one of the two facing substrates (the TFT substrate 2 in this case) is coated with sealing material 6 made of ultraviolet curing resin, thermal curing resin and the like by use of a screen printing method, a dispenser writing method and the like. In addition, the substrate is coated with Ag (109). By use of a wet spraying method or a dry spraying method, spacers 7 such as polymer beads and silica beads are sprayed onto the other substrate (the counter substrate 3 on this case), and the spacers 7 are caused to adhere onto the substrate (110) (as shown in FIG. 2D). In this occasion, depending on a condition in which the spacers 7 are sprayed, the spacers 7 are not distributed adequately, and coagulate so that coagulations of spacers 7a may remain on the substrate in some cases.

Figure 2F:
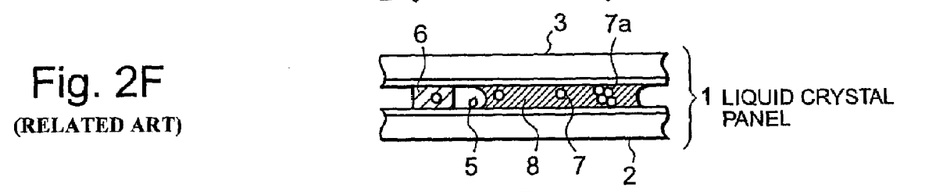
Figure 2G:
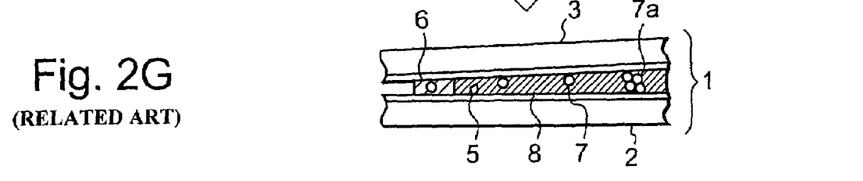

Subsequently, by use of a dispenser for dispensing liquid crystal or the like, liquid crystal 8 is dispensed in an adequate amount in a display area surrounded by the sealing material 6 on one of the two substrate (the TFT substrate in this case) in a normal pressure (as shown in FIG. 2E). Thereafter, the other substrate (the counter substrate in this case) is positioned and aligned thereto (as shown in FIG. 2F). Then, the pair of substrates are pressed against each other from the outsides of the respective substrates so that the sealing material 6 is squashed, thereby forming a desired gap between the two substrates. Thence, the sealing material 6 is temporarily cured by irradiating beams of ultraviolet light or the like onto the sealing material 6 from the back of the substrate (the TFT substrate in this case). Thereafter, the sealing material 6 is heated at a temperature of around 120° C., and thereby is completely cured (114) (as shown in FIG. 2G). Subsequently, the pair of substrates are cut along a predetermined portion outside the sealing material 6 (115). The LCD 1 is formed through the aforementioned processes.

However, the aforementioned method of manufacturing an LCD using the normal-pressure dispensation alignment method brings about the below-described problems.

A first problem is deterioration in reliability of a liquid crystal panel, which is caused by the following mechanism. According to the normal-pressure dispensation alignment method, each process is performed in the atmosphere. For this reason, residues, for example, inorganic ions such as $Na^+$, $K^+$ and $Cl^-$ as well as organic matters such as phthalate esters and cyclic siloxane, stick onto the surfaces of the respective substrates. For example, if inorganic ions would be mixed into the liquid crystal 8, leak and the like would be caused. This would bring about visible defects, such as reduction in voltages applied to the respective common electrodes and the like as well as stain to be visualized in a periphery of the LCD.

A second problem is reduction of yields, which is caused by the following mechanism. The conventional normal-pressure dispensation alignment method does not have a step of cleaning the surfaces of the respective substrates immediately before liquid crystal is dispensed. Accordingly, residues 5, such as waste pieces of thread of the buff cloth and shavings of the alignment layers, which have been unable to be removed, and foreign object, such as coagulations of spacers 7a, which have stuck to the surfaces of the respective substrates in the step of spraying spacers, may remain in some cases. In each of portions into which the residues 5 and the coagulations of spacers 7a have been mixed, the thickness of liquid crystal 8 is reduced, thereby causing visible defects such as defects of visualized bright dots (what is called bright defects).

A third problem is another reduction in yields, which is caused by the following mechanism. In a heating step of completely curing the sealing material 6, organic matters which have been formed on the surfaces of the respective substrates (for example, alignments layers 4) may be activated, thereby causing migration. Accordingly, for example, the alignment direction of the alignment layers 4 is put out of order, thus causing visible defects such as visualized bright defects (which is called alignment brightness).

The present invention has been made with the aforementioned problems taken into consideration. A first object of the present invention is to provide a method of manufacturing an LCD whose reliability and yields can be improved by securely removing inorganic ions, dust including organic matters, residues and contaminant particles such as coagulations of spacers which have stuck to the substrates facing each other so as to reduce visible defects.

In addition, a second object of the present invention is to provide a method of manufacturing an LCD whose yields can be improved by inhibiting organic matters, which have been formed on the substrates, from activating so as to reduce visible defects.

SUMMARY OF THE INVENTION

A basic method of manufacturing an LCD according to the present invention includes the following steps. The method includes, first of all, a contaminant removing step of removing contaminants on the surfaces of the respective alignment layers by use of means other than the following cleaning after cleaning a pair of substrates on which processes of rubbing the respective alignment layers have been performed. In addition, the method includes a liquid crystal dispensing step of dispensing liquid crystal on the alignment layer of at least one of the pair of substrates on which the contaminant removing step has been performed. Furthermore, the method includes a step of arranging the pair of substrates to face each other, and of sealing the liquid crystal, after the liquid crystal dispensing step.

In addition, the present invention has the below-described characteristics. A first characteristic of the present invention is as follows. In the aforementioned method of manufacturing an LCD, the aforementioned contaminants are at least any one of a group of inorganic ions and a group of organic matters, and the aforementioned contaminant removing step is to perform a vacuum drying step of heading the pair of substrates in a low-pressure atmosphere.

A second characteristic of the present invention is as follows. In the aforementioned basic method of manufacturing an LCD, the contaminants are contaminant particles which have been unable to be removed in the cleaning step, and which remains. The contaminant removing step is to perform a suction process of sucking up contaminants from the pair of substrates by use of air flow which is generated in the vicinity of the edge of a nozzle having a predetermined shape.

A third characteristic of the present invention is as follows. In the aforementioned basic method of manufacturing an LCD, the contaminants are contaminant particles which have been unable to be removed in the cleaning steps, and which remains. The contaminant removing step is to perform a blowing process of blasting air flow to which ultrasonic waves have been applied against the pair of substrates and thereby removing the contaminants.

A fourth characteristic of the present invention is as follows. The aforementioned basic method of manufacturing an LCD further includes a spacer spraying step of spraying particle spacers to one of the pair of substrates before the liquid crystal dispensing step is performed. The contaminants are coagulations of spacers which have stuck to the substrates in the spacer spraying steps, and the contaminant removing step is to perform a suction process of sucking up the coagulations of spacers from the pair of substrates by use of air flow which is generated in the vicinity of the edge of a nozzle having a predetermined shape.

A fifth characteristic of the present invention is as follows. The aforementioned basic method of manufacturing an LCD further includes a spacer spraying step of spraying particle spacers to at least one of the pair of substrates before the liquid crystal dispensing step is performed. The contaminants are coagulations of spacers which have stuck to the substrates in the spacer spraying step. The contaminant removing step is to perform a blowing process of blowing air flow to which ultrasonic waves have been applied against the pair of substrates, thereby removing the contaminants.

A sixth characteristic of the present invention is as follows. The aforementioned basic method of manufacturing an LCD further includes a spacer spraying step of spraying particle spacers to at least one of the pair of substrates before the liquid crystal dispensing step is performed. The contaminant removing step includes a first removal sub-step to be performed before the spacer spraying step is performed, and a second removal sub-step to be performed after the spacer spraying step is performed. The first removal sub-step is to perform a vacuum drying process of heating the substrates in a low-pressure atmosphere. The second removal sub-step is to perform any one of a suction process of removing the contaminants by sucking up the contaminants and a blasting process of blowing air flow to which ultrasonic waves have been applied against the substrates and thereby removing the contaminants.

A seventh characteristic of the present invention is as follows. The aforementioned basic method of manufacturing an LCD further includes a sealing material forming step of forming sealing material for sealing on at least one of the pair of substrates before the liquid crystal dispensing step is performed. The contaminant removing step includes a first removal sub-step to be performed before the sealing material forming step is performed, and a second removal sub-step to be performed after the sealing material forming step is performed. The first removal sub-step is to perform a vacuum drying process of heating the substrates in a low-pressure atmosphere. The second removal sub-step is to perform any one of a suction process of removing the contaminants by sucking up the contaminants and a blowing process of blowing air flow to which ultrasonic waves have been applied against the substrates and thereby removing the contaminants An eighth characteristic of the present invention is as follows. The aforementioned basic method of manufacturing an LCD further includes a sealing material forming step of forming sealing material for sealing on at least one of the pair of substrates before the liquid crystal dispensing step is performed. A sealing material curing process includes a complete curing sub-process to be performed after a desired gap is formed between the pair of substrates, and the complete curing sub-process is performed at a temperature which is equal to a lowest temperature at which the sealing material is cured.

It is preferable that the complete curing process be performed at a temperature of approximately 80° C. In addition, it is preferable that the sealing material curing process include a temporary curing step to be performed immediately after the pair of substrates are aligned.

According to the method of manufacturing an LCD of the present invention, the following process is added to a method of manufacturing an LCD by which liquid crystal is dispensed onto one of a pair of substrates at a normal pressure, and by which the two substrates are aligned by use of sealing material. The added process is a vacuum drying process. This is to heat the pair of substrates in a low-pressure atmosphere after a cleaning step posterior to a rubbing process which has been performed on the alignment layers formed respectively on the pair of substrates In addition, according to the method of manufacturing an LCD of the present invention, the following process is added to the method of manufacturing an LCD by which liquid crystal is dispensed onto one of the pair of substrates at a normal pressure, and by which the substrate and the two substrates are aligned by use of sealing material. The added process is any one of a suction process and a blowing process to be performed before liquid crystal is dispensed onto one of the pair of substrates at a normal pressure. The suction process is to suck up contaminant particles by use of air flow which is generated in the vicinity of the edge of a nozzle having a predetermined shape. The blowing process is to blast air flow to which ultrasonic waves have been applied against the pair of substrates, thereby removing contaminant particles.

Furthermore, according to the method of manufacturing an LCD of the present invention, the following modified process is added to the method of manufacturing an LCD by which liquid crystal is dispensed onto one of the pair of substrates at the normal pressure, and by which the two substrates are aligned by use of sealing material. The added modified process is a process of curing sealing material. The process of curing sealing material is constituted of a temporary curing sub-process to be performed immediately after the pair of substrates are aligned and a complete curing sub-process to be performed after a desired gap is formed between the pair of substrates. The complete curing sub-process is performed at a temperature which is equal to a lowest temperature which can cure the sealing material. It is preferable that the complete curing sub-process be performed at a temperature of approximately 80° C.

Moreover, the method of manufacturing an LCD according to the present invention can be configured of two or more processes to be selected out of the vacuum drying process, one of the suction process and the blowing process, as well as the complete curing process.

According to the present invention, as described above, contaminant particles which have stuck to the substrates can be removed securely by the below-described processes added to the method of manufacturing an LCD using the normal-pressure dispensation alignment method. The vacuum drying process of heating the substrates at a predetermined low-pressure atmosphere is performed after the cleaning step and the drying step posterior to the formations of the alignment layers, and before the step of writing with the sealing material or before the spacer spraying step. In addition, after the step of writing with sealing material or after the spacer spraying step, and before liquid crystal is dispensed, any one of the suction step using a nozzle with a specialized shape and the ultrasonic wave air flow blasting step of blasting air flow to which ultrasonic waves have been applied against the pair of substrates is performed. This can check deterioration in reliability of an LCD, such as fluctuation in electric potential of common electrodes and stain in a peripheral of the LCD, thus enabling visible defects such as bright defects to be reduced, and yields to be improved. Furthermore, the present invention brings down a temperature at which the sealing material is cured, thereby inhibiting organic matters, which have been formed on the substrates, from being activated (migrated). Accordingly, visible defects such as alignment bright defects can be reduced, thereby enabling yields to be improved.

DETAILED DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

As described by review of the conventional techniques, the normal-pressure dispensation alignment method of dispensing liquid crystal in a normal-pressure brings about an advantage which can allow manufacturing facilities to be simplified, and another advantage which enables the spread of liquid crystal to be controlled with ease. By contrast, since the processes are performed in the atmosphere, inorganic ions and dust including organic matters which are included in the air of a clean room are apt to stick to the substrates. Furthermore, in some cases, residues which have stuck to the substrates while the rubbing process is being performed and coagulations of spacers which have been stuck to the substrates while the spacers are being sprayed may remain on the substrates. This brings about a problem which causes visible defects, thereby deteriorating reliability in the LCD and reducing yields thereof. In addition, even if such contaminant particles would be removed, conditions of organic matters such as the alignment layers would be changed by the heating process to be performed for completely curing the sealing material. Accordingly, visible defects remain to be caused.

The methods for manufacturing an LCD include a variety of specialized steps such as a step of performing the rubbing process and a step of performing the spacer spraying process. There are a variety of restrictions such as a necessity of avoiding damaging an alignment direction of the alignment layers while the cleaning process and the drying process are being performed respectively. For this reason, it is necessary to grasp what cleaning method and what drying method should be applied at what step in order to remove contaminant particles effectively and securely. In addition, even if contaminant particles would be removed completely, conditions of organic matters such as the alignment layers might be changed by the heating process, thereby causing visible defects. Accordingly, when a temperature is intended to be set for the heating process, attention needs to be paid to influence of the temperature on other constituent members.

The applicant of the present inventor has carried out experiments with the aforementioned viewpoints into consideration. As a result of the experiments, it has been found that the aforementioned problems can be solved by performing a vacuum drying process of heating the substrates in a low-pressure atmosphere after the cleaning step and the drying step posterior to the process of rubbing the alignment layers, and before the step of writing with sealing material or before the spacer spraying step. In addition, it has been found that the aforementioned problems can be solved by performing the following two processes after the step of writing with sealing material or after the spacer spraying step, and before liquid crystal is dispensed. The two processes are a suction step of sucking up contaminant particles on the surfaces of the respective substrates by use of a nozzle with a specialized shape and an ultrasonic wave air blowing step of blowing air flow to which ultrasonic waves have been applied against the substrates. Furthermore, it has been found that the aforementioned problems can be solved by performing the complete curing process on the sealing material at a temperature as low as approximately 80° C. Detailed descriptions will be provided below for the method of manufacturing an LCD according to the present invention with reference to the accompanying drawings.

First Embodiment

Descriptions will be provided for a method of manufacturing an LCD according to a first embodiment of the present invention with reference to FIGS. 3 and 4A to 4H. Generally, an LCD includes a TFT substrate on which switching devices such as TFTs have been formed, and a counter substrate on which color filters, black matrixes and the like have been formed. With regard to the LCD, alignment layers on which an alignment process has been performed are formed on the surfaces of the respective substrates facing each other. Thereafter, spacers with insulating properties, such as polymer beads and silica beads having a predetermined shape, are arranged in the interval of the two substrates, thereby forming a predetermined gap. Accordingly, the LCD controls an alignment direction of the liquid crystal, which has been sealed in the gap, by use of an electric field made of electrodes which have been formed on at least one of the two substrates, thereby displaying an image. For this reason, contaminant particles must not be mixed into the gap between the two substrates in order to improve reliability and yields of the LCD. With this taken into consideration, in the present embodiment, the LCD is manufactured by use of the following method in order to effectively remove contaminant particles which have stuck to the substrates in each step.

As shown in FIGS. 3 and 4A to 4H, first of all, a TFT substrate 2 and a counter substrate 3 are prepared. On the TFT substrate 2, switching devices such as TFTs have been formed. On the counter substrate 3, color filters, black matrixes and the like have been formed. Before alignment layers 4 are formed respectively on the TFT substrate and the counter substrate, physical cleaning, wet cleaning and dry cleaning are performed on the TNT substrate and the counter substrate (301a and 301b). The physical cleaning includes an ultrasonic cleaning, a brushing cleaning, a jet spray cleaning. The wet cleaning includes a chemical cleaning by use of a surface active agent, detergent, an organic solvent, pure water and the like. The dry cleaning includes an ultraviolet ozone cleaning, a plasma cleaning and a laser cleaning. After these cleanings, the substrates are dried up by use of a hot plate, an IR heating machine, and the like (302a and 302b).

Figure 4A:
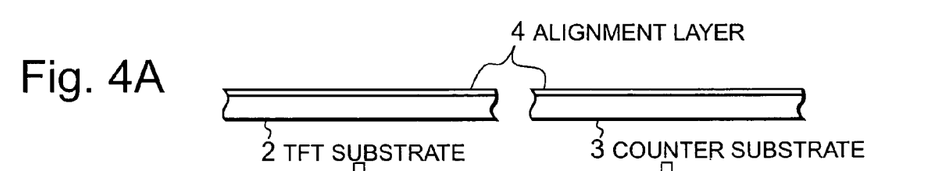
FIGS. 4A to 4H are cross-sectional process flows showing structures of the respective substrates which are processed by use of the normal-pressure dispensation alignment method according to the first embodiment of the present invention.
Figure 4B:
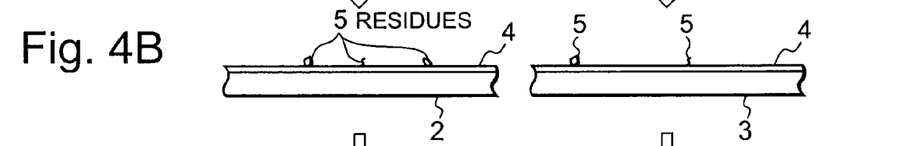
Figure 4C:
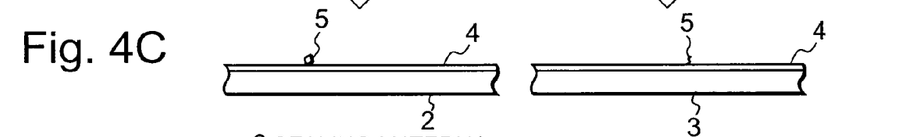

Subsequently, the surfaces respectively of the pair of substrates are coated with material for an alignment layer such as a polyimide solution which has been diluted with an organic solvent by use of a printing machine (303a and 303b). Thereafter, the organic solvent is heated at a temperature of around 80° C. by use of a hot plate, an IR heating machine or the like, and thereby (temporarily baking) the organic solvent is dried up. Subsequently, the complete baking for shrinking the layers coated with the polyimide solution by heating to be dehydrated is performed (304a and 304b) so that the alignment layers 4 are formed with an even thickness (as shown in FIG. 4A). Then, rubbing processes for controlling an initial alignment direction (a pre-tilt angle) of the liquid crystal are performed respectively on the surfaces of the respective post-baked alignment layers 4 in a way that the surfaces of the respective post-baked alignment layers 4 are rubbed in one direction only by use of buff cloth, such as cotton cloth and rayon cloth, which has been rolled up around a rotating metallic roller (305a and 305b). In this occasion, the rubbing by use of the buff cloth generates static electricity, thereby causing residues 5 such as waste pieces of thread of the buff cloth and shavings of the alignment layers to stick to the surfaces of the respective substrates (as shown in FIG. 4b).

Then, in order to remove the residues 5, such as waste pieces of thread of the buff cloth and shavings of the alignment layers, from the surfaces of the respective substrates, the substrates are cleaned (306a and 306b). At this point, as described above, with regard to the cleaning to be preformed after the rubbing processes, a heavy-duty cleaning method can not be applied in order to causing the rubbing processes not to damage the alignment characteristic which has been provided to the alignment layers 4 by the rubbing processes respectively. For this reason, generally, an ultrasonic cleaning method, a jet spray method or the like is applied, those of which use hot ultra pure water, alcohol or the like. Accordingly, the residues 5 may not be removed completely in some cases.

Figure 3:
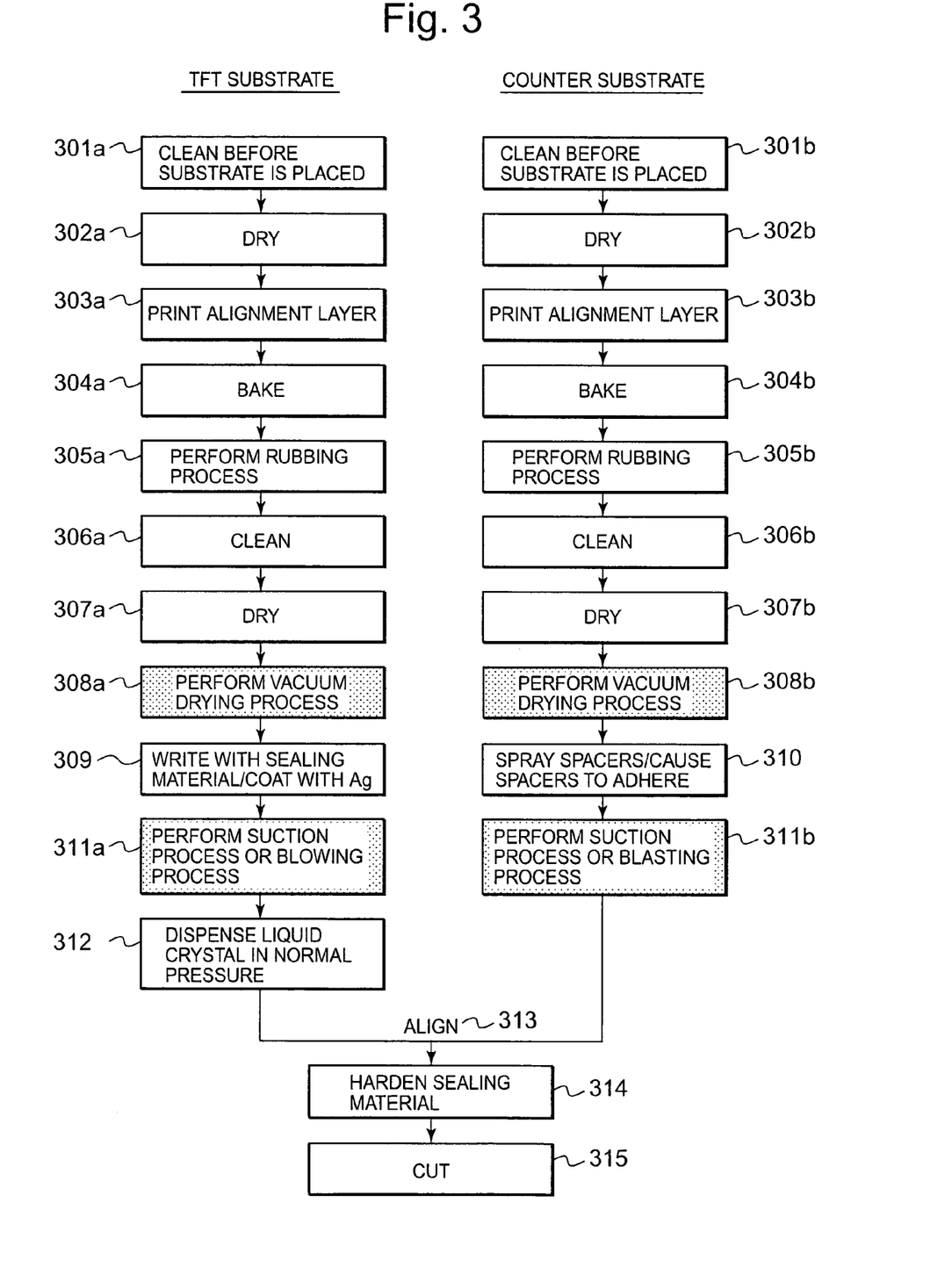
FIG. 3 is a flowchart showing parts of steps of manufacturing an LCD by use of a normal-pressure dispensation alignment method according to a first embodiment of the present invention.

Subsequently, the substrates which have been cleaned are dried up by use of an IR heating machine or the like (307a and 307b). At this point, according to the normal-pressure dispensation alignment method, each process is performed in the atmosphere of a clean room. Even in the clean room, inorganic ions such as $Na^+$, $K^+$ and $Cl^-$ as well as organic matters such as phthalate esters and cyclic siloxane float in the atmosphere. Accordingly, the inorganic ions and the organic matters stick to the surfaces of the respective substrates. For example, if inorganic ions would be mixed into the liquid crystal 8, leak and the like would be caused. This has been a cause which brings about visible defects, such as reduction in voltages applied to the respective common electrodes and the like as well as stain to be visualized in a periphery of the LCD.

With this taken into consideration, in the present embodiment, the substrates thus dried up are put into a vacuum drying furnace as shown in steps (308a and 308b) of FIG. 3. For example, the substrates are heated at a temperature, which has been set at a range of 100° C. to 120° C. on the substrates, for not less than one hour under a condition which has reduced the pressure within the vacuum drying furnaces to being not greater than 1 Pa. By performing such a vacuum drying process (308a and 308b), inorganic ions, dust including organic matters and the like can be removed effectively. Incidentally, in this case, the vacuum drying processes (308a and 308b) are performed after the substrates are dried up (307a and 307b). However, the vacuum drying processes (308a and 308b) may be performed immediately after the substrates are cleaned (306a and 306b).

Subsequently, by use of a dispenser or the like, the writing with sealing material 6 made of resins or the like which will be cured by beams of ultraviolet light and heat is performed, for example with a width of 0.3 mm to 0.4 mm and a height of 30 μm to 40 μm, on one of the two substrates (the TFT substrate 2 in this case), thereby defining an area in which liquid crystal is sealed. As this sealing material 6, a hybrid type of sealing material may be used, the hybrid type being made by a mixture of ultraviolet curing resin and thermal curing resin. In addition, the method of forming patterns with the sealing material 6 is not limited to the coating by use of a dispenser, but a coating by use of a screen printing system may be used. Subsequently, material for wiring, for example silver (Ag), is coated in order to electrically connect electrodes on the TFT substrate and electrodes on the counter substrate (309).

Figure 4D:
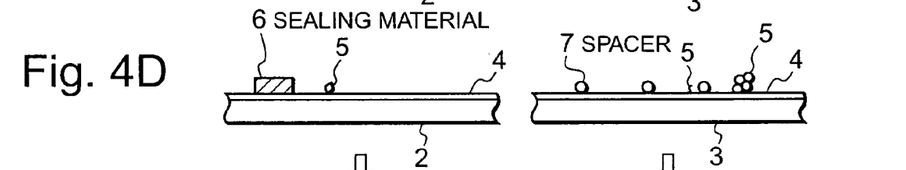

In addition, for the purpose of controlling the gap between the substrates, spacers 7 such as polymer beads and silica beads are sprayed onto a display area of the other substrate of the two (the counter substrate 3 in this case) by use of a wet spraying method or a dry spraying method, thereby causing the spacers 7 to adhere to the substrate (310) (as shown in FIG. 4D). The wet spraying method is to spray a solution which is made by a mixture of the spacers 7 with a solvent such as water and alcohol, and to thereafter dry and remove the solvent. The dry spraying method is to spray powder spacers 7 directly by use of air flow of compressed dry nitrogen or the like. In these cases, as described above, depending on a condition of spraying spacers 7, there may be some cases where the spacers 7 are not sprayed evenly so that coagulations of spacers 7a are caused.

Subsequently, liquid crystal is going to be dispensed. According to the conventional method of manufacturing an LCD, the substrates are not cleaned immediately (5 to 10 minutes) before liquid crystal is dispensed. For this reason, the residues 5, such as waste pieces of thread and shavings, which have been unable to be removed in the cleaning step posterior to the rubbing process may remain in some cases, and contaminant particles such as coagulations of spacers 7a which have been made while the spacers 7 are being sprayed may remain in other cases. If residues of this kind remained, the thickness of liquid crystal would be changed at a portion where the residues remain. Accordingly, there would be a possibility where visible defects such as defects of bright dots being visible (bright defects) would be caused.

With this taken into consideration, in the present embodiment, a process by use of a suction machine which is called a vacuum cleaner (hereinafter referred to a "suction process") is performed, or a process by use of an ultrasonic wave air flow generating machine which is called a US cleaner (hereinafter referred to as an "ultrasonic wave air flow blowing process") is performed, in order to remove these contaminant particles securely (311a and 311b).

Figure 4E:
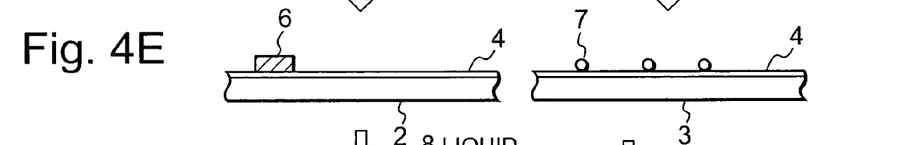
Figure 6:
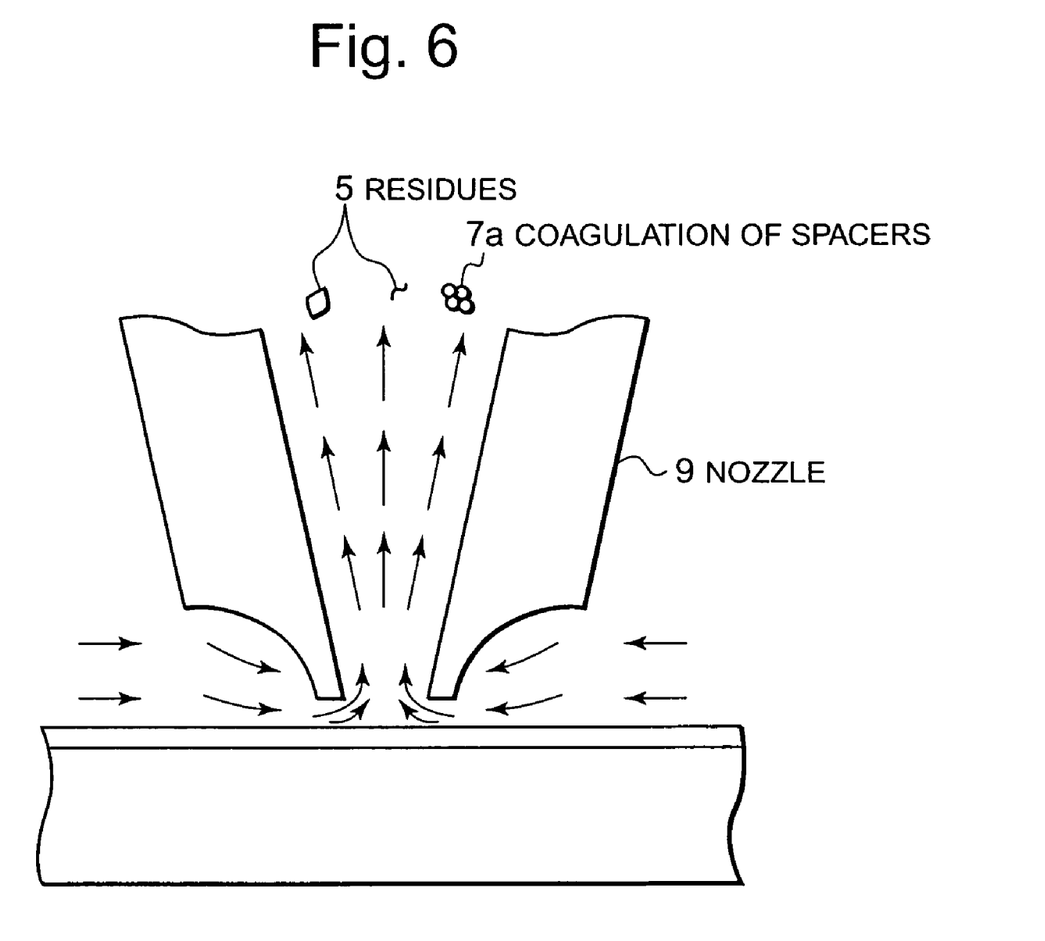
FIG. 6 is a diagram describing a function to be performed by a vacuum cleaner which is used for a suction step according to the first embodiment of the present invention.

The aforementioned vacuum cleaner is provided with a nozzle 9 whose edge is processed in a specialized shape as shown in FIG. 6. In addition, rapid air flow is produced around the edge of the nozzle 9 by reducing pressure, for example, to being equal to, or lower than, 1 Pa inside the nozzle 9. Thereby, contaminant particles which have stuck to the substrates can be sucked up. In the present embodiment, for the purpose of removing the residues 5 and the coagulations of spacers 7a effectively, the distance between each of the substrates and the nozzle 9 is set at approximately 1 mm or shorter than 1 mm. The blower pressure is set at approximately 6 KPa. The table speed is set at approximately 100 mm/sec. With these, the nozzle 9 is caused to move back and forth on each of the substrates approximately 6 times. In addition, the US cleaner is to blow a gas such as pure air and nitrogen, to which ultrasonic waves are applied, against each of the samples. Accordingly, the US cleaner can securely remove contaminant particles which have stuck to the substrates in comparison with a regular blowing process. By performing the suction process and the ultrasonic wave air flow blowing process in these manner, residues 5 and coagulations of spacers 7a can be removed securely, thereby enabling the surfaces of the respective substrates to be kept clean, as shown in FIG. 4E. Incidentally, in the present embodiment, both a combination of the vacuum drying process and the suction process as well as a combination of the vacuum drying process and the ultrasonic wave air flow blasting process are configured to be performed. However, only any one of the two combinations may be performed. Alternately, all of the vacuum drying process, the suction process and the ultrasonic wave air flow blowing process may be performed.

Figure 4F:
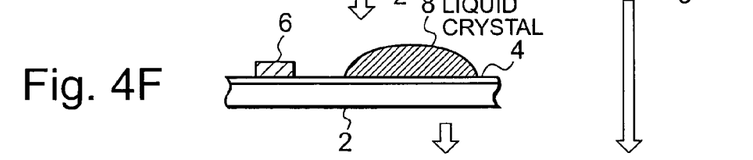

Subsequently, an adequate amount of liquid crystal 8 is dispensed (312) in a predetermined inner area surrounded by the sealing material 6 on the TFT substrate by use of a dispenser or the like for dispensing liquid crystal in a way that liquid crystal 8 is filled in the gap between the substrates in a compressed state of the sealing material 6 (as shown in FIG. 4F).

Figure 4G:
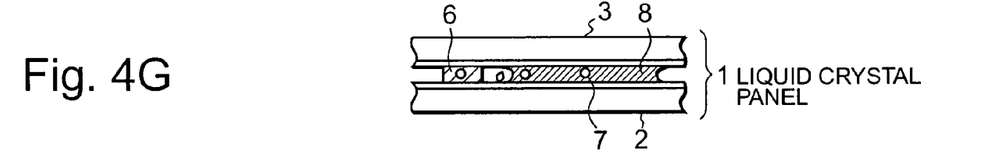
Figure 4H:
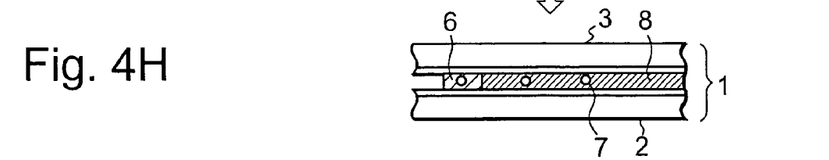
Figure 5A:
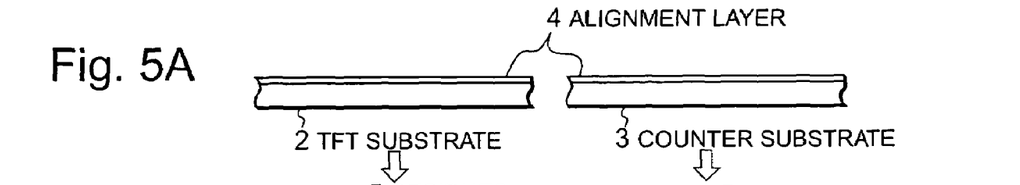
FIGS. 5A to 5H are other cross-sectional process flows showing the structures of the respective substrates which are processed by use of the normal-pressure dispensation alignment method according to the first embodiment of the present invention.
Figure 5B:
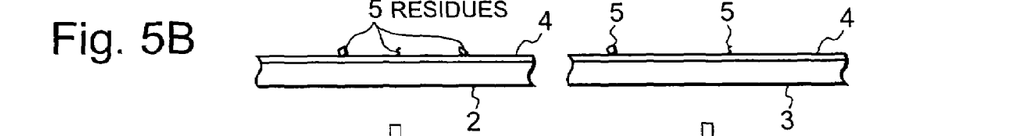
Figure 5C:
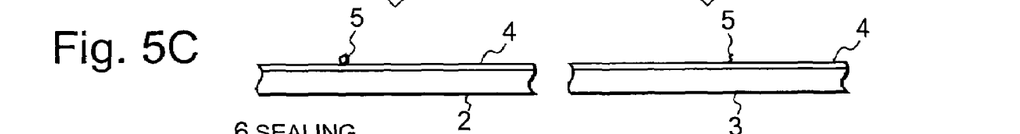
Figure 5D:
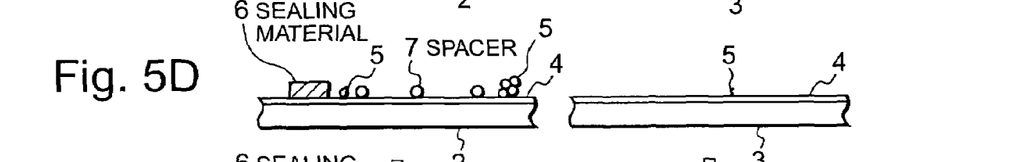
Figure 5E:
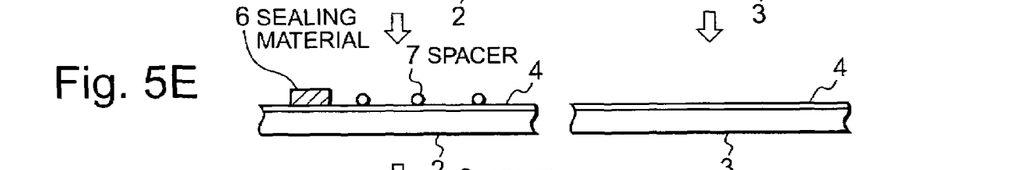
Figure 5F:
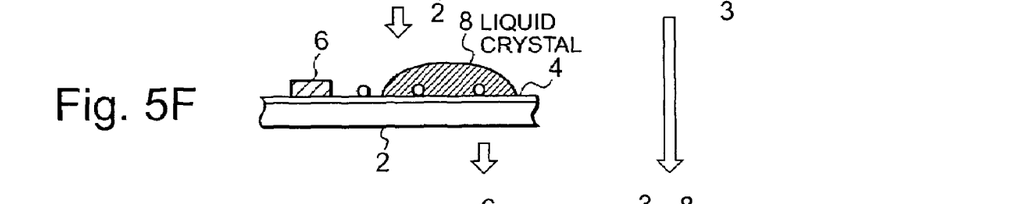
Figure 5G:
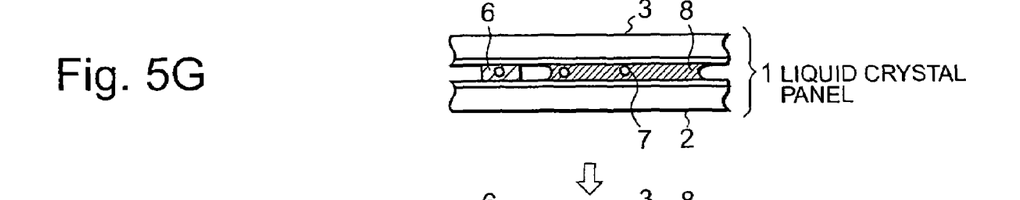
Figure 5H:
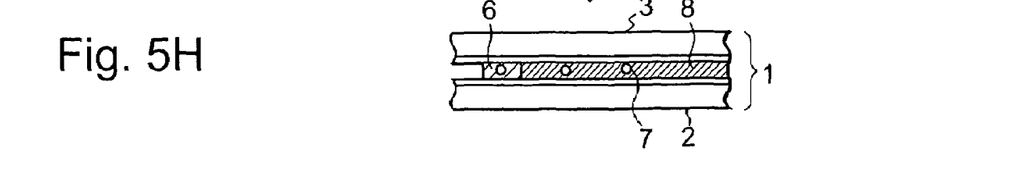

Thereafter, the TFT substrate and the counter substrate are positioned in a way that the surface onto which the liquid crystal 8 has been dispensed and the surface onto which the spacers 7 have been sprayed face each other. Thereby, the TFT substrate and the counter substrate (313) are aligned (as shown in FIG. 4G). Then, beams of ultraviolet light are irradiated from the back of each of the two substrates, thereby temporarily curing the sealing material 6 (314). Subsequently, the sealing material 6 is compressed by adding a load of approximately $0.1 \text{ N/mm}^2$ from outside the two substrates. Concurrently, the pair of substrates are heated, thereby completely curing the sealing material 6. Accordingly, the liquid crystal 8 is sealed (as shown in FIG. 4H). Thereafter, the TFT substrate 2 and the counter substrate 3 are cut along a predetermined portion (315) outside the area surrounded by the sealing material 6. In this manner, the LCD 1 is formed.

It should be noted that the descriptions which have been provided shows an example of a method of manufacturing an LCD according to the present embodiment. Conditions and the like for processing steps other than the vacuum drying processes (308a and 308b), the suction processes and the ultrasonic wave air flow blowing processes (311a and 311b) are not limited to the aforementioned conditions. In other words, the drying steps (307a and 307b) and the like may be omitted. Alternately, steps other than the aforementioned steps may be added depending on the necessity. FIGS. 3 and 4A to 4H show a case where the writing with sealing material 6 is performed on the TFT substrate 2 and liquid crystal 8 is dispensed on the TFT substrate 2 whereas spacers 7 are sprayed onto the counter substrate 3. However, the writing with sealing material 6 may be performed on the counter substrate 3 and liquid crystal 8 may be dispensed on the counter substrate 3, whereas spacers 7 may be sprayed onto the TFT substrate 2. In addition, as shown in FIGS. 5A to 5H, the writing with sealing material 6 may be performed on one to the two substrates (the TFT substrate in this case), and spacers 7 may be sprayed on the same substrate (or the same substrate may be coated with sealing material 6 into which spacers 7 have been mixed), too. Furthermore, the descriptions have been provided for the configuration with which the vacuum drying processes (308a and 308b) are preformed immediately after the drying steps (307a and 307b), and with which the any one of a group of the suction processes and a group of the ultrasonic wave air flow blowing processes (311a and 311b) is performed immediately before liquid crystal is dispensed (312). However, both of a combination of the vacuum drying process and the suction process as well as the combination of the vacuum drying process and the ultrasonic wave air flow blowing process may be performed at the same time immediately after the drying steps (307a and 307b) or immediately before liquid crystal is dispensed (312).

In the method of manufacturing an LCD according to the present embodiment, the vacuum drying processes are performed after the cleaning steps and the drying steps posterior to the rubbing processes in the aforementioned manner. Furthermore, the suction processes or the ultrasonic wave air flow blowing processes are performed after the writing with sealing material or after the spraying of spacers, thereby making it possible to securely remove contaminant particles such as inorganic ions and dust including organic matters which have stuck to the substrates as well as residues 5 and coagulations of spacers 7a which remain on the substrates. As a result of this, it is made possible to prevent reliability of the panel from being deteriorated by fluctuation in voltages of the respective common electrodes, stain in a periphery of the substrates and the like, and it is also made possible to reduce bright defects. Accordingly, the yields can be improved.

Next, in order to check on effects to be brought about by the manufacturing method according to the first embodiment of the present invention, the number of contaminant particles to be caused when the suction process is performed and the number of contaminant particles to be caused when the suction process is not performed have been counted. In addition, the number of visible defects (bright defects) to be caused when the vacuum drying process is performed and the number of visible defects (bright defects) to be caused when the vacuum drying process is not performed have been counted. The results are shown in FIGS. 8 and 9.

Figure 8:
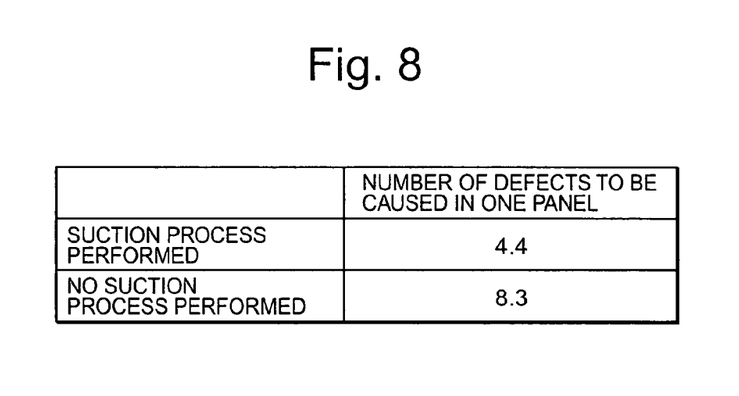
FIG. 8 is a table confirming effects to be brought about by the manufacturing method according to the first embodiment of the present invention.
Figure 9:
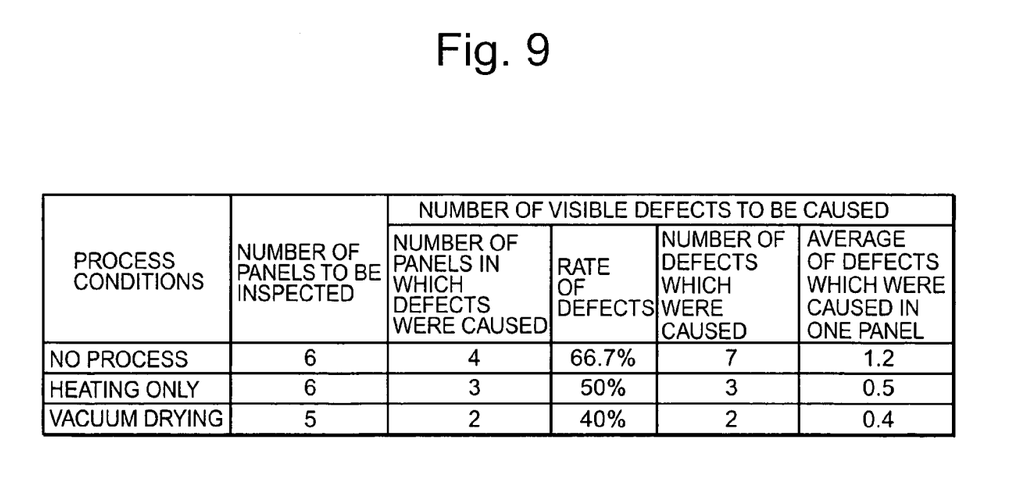
FIG. 9 is another table confirming effects to be brought about by the manufacturing method according to the first embodiment of the present invention.

As shown in FIG. 8, it has been found that the performing of a suction process by use of a vacuum cleaner reduces the number of residues caused in a panel to approximately a half of the number of residues caused in a panel on which the suction process is not performed. Accordingly, it has been confirmed that the suction process according to the present embodiment has positive effects on improvement in the yields. Moreover, as shown in FIG. 9, it has been found that the number of visible defects caused in a sample on which only a heating is performed is approximately a half of the number of visible defects caused in a sample on which the drying is performed without the heating, and that the number of visible defects caused in a sample on which the vacuum drying process according to the present embodiment is performed is one third (from 1.2 to 0.4) of the number of visible defects caused in a sample on which the drying has been performed without the heating. Accordingly, it has been confirmed that the vacuum drying process according to the present embodiment has positive effects on improvement in the yields.

Second Embodiment

Figure 7:
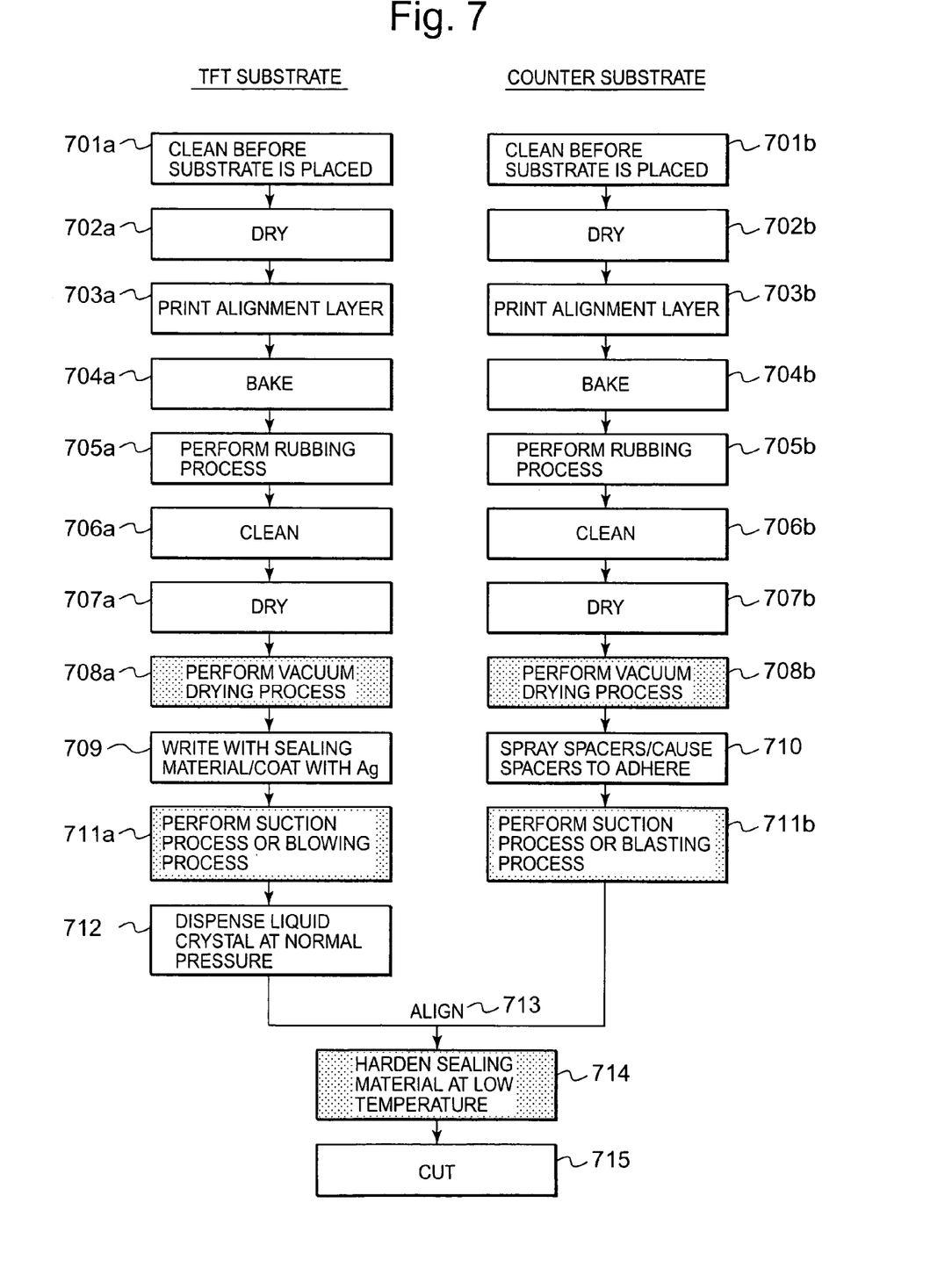
FIG. 7 is a flowchart showing parts of steps of manufacturing an LCD by use of a normal-pressure dispensation alignment method according to a second embodiment of the present invention.

Next, descriptions will be provided for a method of manufacturing an LCD according to a second embodiment of the present invention with reference to FIG. 7. FIG. 7 is a flowchart showing parts of processes of manufacturing an LCD according to the second embodiment.

Use of the aforementioned manufacturing method according to the first embodiment would be able to improve reliability of the panel and to increase the yields. However, even if contaminant particles on the surfaces of the respective substrates were removed, for example, organic matters such as the alignment layers which have been formed on the TFT substrate 2 and the counter substrate 3 are activated and migrated as the temperature rises. It has been known, for example, that, as a result of the activation and the resultant, an initial alignment direction of the alignment layers is changed so that visible defects such as defects which cause parts of the LCD to be displayed brightly (what are called alignment bright defects) are brought about. With this taken into consideration, according to the second embodiment, a temperature at which the sealing material is completely cured is set at a lower one, thereby inhibiting the aforementioned visible defects from being caused. Descriptions will be provided below for a specific method of doing this with reference to FIG. 7.

As in the case of the first embodiment, the TFT substrate 2 and the counter substrate 3 are cleaned by use of a predetermined wet cleaning method or a predetermined dry cleaning method (701*a* and 701*b*). Subsequently, the substrates are dried up by use of a hot plate, an IR heating machine or the like (702*a* and 702*b*). Thereafter, the surfaces of the respective substrates are coated with material for an alignment layer, such as a polyimide solution which has been diluted with an organic solvent, by use of a printing machine (703*a* and 703*b*). Then, the substrates are temporarily baked at a temperature of around 80° C. by use of a hot plate, an IR heating machine or the like. Thence, the complete baking (704*a* and 704*b*) for concentrating the layers coated with the polyimide solution by heating dehydration is performed so that the alignment layers 4 are formed with an even thickness.

Subsequently, for the purpose of controlling an initial alignment direction (a pre-tilt angle) of the liquid crystal, rubbing processes (705*a* and 705*b*) are performed respectively on the surfaces of the respective post-baked alignment layers 4 in a way that the surfaces of the respective post-baked alignment layers 4 are rubbed in one direction only by use of buff cloth which has been rolled up around a rotating metallic roller.

Thereafter, in order to remove residues 5, such as waste pieces of thread of the buff cloth and shavings of the alignment layers, from the surfaces of the respective substrates, the substrates are cleaned (706*a* and 706*b*). Subsequently, the substrates which have been cleaned are dried up by use of an IR heating machine or the like (707*a* and 707*b*). Then, in order to remove inorganic ions and dust including organic matters, which have stuck to the substrates from the atmosphere, the substrates which have been dried up are put into a vacuum drying furnaces, and vacuum drying processes (708*a* and 708*b*) are performed, for example, in a way that the substrates are heated at a temperature, which has been set at a range of 100° C. to 120° C. on the substrates, for more than one hour under a condition which has reduced the pressure within the vacuum drying furnace to being equal to, or lower than, 1 Pa.

Subsequently, by use of a dispenser or the like, the writing with sealing material 6 made of resins or the like which will be cured by beams of ultraviolet light and heat is performed on one of the two substrates (the TFT substrate 2 in this case). Thereafter, Ag is coated on the substrate in order to electrically connect electrodes on the TFT substrate and electrodes on the counter substrate (709).

In addition, spacers 7 such as polymer beads and silica beads with which to control the gap between the substrates are sprayed onto a display area of the other substrate of the two (the counter substrate 3 in this case) by use of a wet spraying method or the dry spraying method. Incidentally, in a case where the wet spraying method is used, the solvent is removed, and the spacers 7 are caused to adhere to the counter substrate 3 (710).

Subsequently, any one of a suction process by use of a suction machine such as a vacuum cleaner and an ultrasonic wave air flow blowing process by use of a machine for generating an ultrasonic wave air flow such as a US cleaner is performed in order to remove residues 5, such as waste pieces of thread and shavings, which have been unable to be removed in the cleaning step posterior to the rubbing process, as well as contaminant particles, such as coagulations of spacers 7*a*, which have been made while spacers 7 are being sprayed (711*a* and 711*b*).

Then, an adequate amount of liquid crystal 8 is dispensed (712) in a predetermined inner area surrounded by the sealing material 6 on the TFT substrate by use of a dispenser or the like for dispensing liquid crystal in a way that liquid crystal 8 is filled in the gap between the substrates in a compressed state of the sealing material 6. Thereafter, the TFT substrate and the counter substrate are positioned in a way that the surface onto which the liquid crystal 8 has been dispensed and the surface onto which the spacers 7 have been sprayed face each other, thereby aligning the TFT substrate and the counter substrate (713). Then, the sealing material 6 is cured (714).

This step of curing the sealing material 6 includes a temporary curing for temporarily fixing the pair of substrates and a complete curing for fastening the pair of substrates completely. A conventional temporary curing is performed while heating by irradiation of beams of ultraviolet light, or while heating at a temperature of approximately 80° C. In addition, a conventional complete curing is performed by heating at a temperature of approximately 120° C. for approximately one hour.

However, the temperature at which the sealing material 6 is heated is higher, when the sealing material 6 is intended to be cured completely. For this reason, organic matters such as the alignment layers 4 which have been formed on the respective substrates are activated so that migrations arise. The migrations cause, for example, the alignment characteristic of the alignment layers 4 to be put out of order. Accordingly, visible defects such as alignment bright defects are caused due to this disorder. In addition, it has been known that liquid crystal 8 will be transformed from a nematic liquid crystal phase to an isotropic liquid crystal phase at a predetermined temperature (phase transition temperature: TNI). By this phase transition, the chemical structure of liquid crystal 8 will change after the temperature at which the sealing material 6 is cured exceeds the phase transition temperature. For this reason, the temperature at which the sealing material 6 is completely cured needs to be checked so that the temperature is equal to or lower than the phase transition temperature. On the other hand, if the temperature for the complete curing would be caused to be equal to, or lower than, a reaction temperature of a polymerization initiator which is included in the sealing material 6, the sealing material 6 is not cured so that the pair of substrates can not be fastened together securely.

With this taken into consideration, the numbers of visible defects (alignment bright defects) to be caused have been counted by changing a temperature for the curing and a length of time for the curing in order to determine an optimal temperature for completely curing the sealing material 6. The results are shown in FIG. 10.

Figure 10:
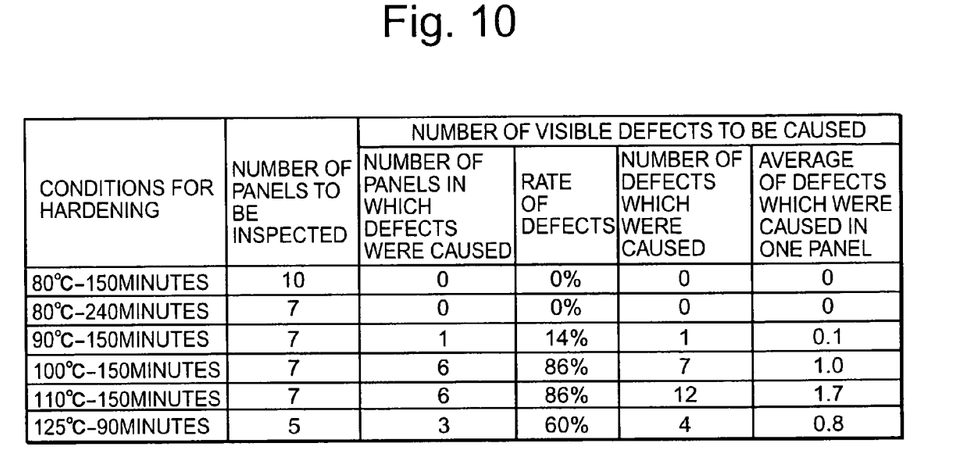
FIG. 10 is a table confirming effects to be brought about by the manufacturing method according to the second embodiment of the present invention.

As shown in FIG. 10, visible defects were caused when the temperature for the curing was equal to, and higher than, 90° C., whereas visible defects were not caused when the curing was performed at 80° C. for a longer time. Incidentally, with regard to epoxy sealing material 6 of heat curing type, the temperature for the curing can not be equal to, or lower than, 80° C., since a reaction temperature of the polymerization initiator is 80° C. Accordingly, in the present embodiment, liquid crystal 8 whose phase transition temperature is higher than 80° C. is used, and the sealing material 6 is heated at a temperature of approximately 80° C. for a longer time (eight hours), thereby inhibiting visible defects from being caused.

Thereafter, the TFT substrate 2 and the counter substrate 3 are cut along a predetermined portion (715). Thus, the LCD 1 is performed.

As described above, the temperature for curing the sealing material 6 is set to be as low as possible under conditions that the sealing material 6 can be cured completely, and that the phase transition of the liquid crystal 8 can be inhibited. By this, organic matters such as the alignment layers which have been formed on the respective substrates can be inhibited from being activated, thereby preventing migrations. Accordingly, visible defects can be inhibited from being caused due to disorder of the alignment characteristic of the alignment layers 4.

Next, the number of visible defects to be caused has been counted for each of the following samples which were prepared in order to check on effects to be brought about by the lowering of the temperature which cures the sealing material according to the present embodiment and by the vacuum drying process according to the first embodiment. The results are shown in FIG. 11.

Figure 11:
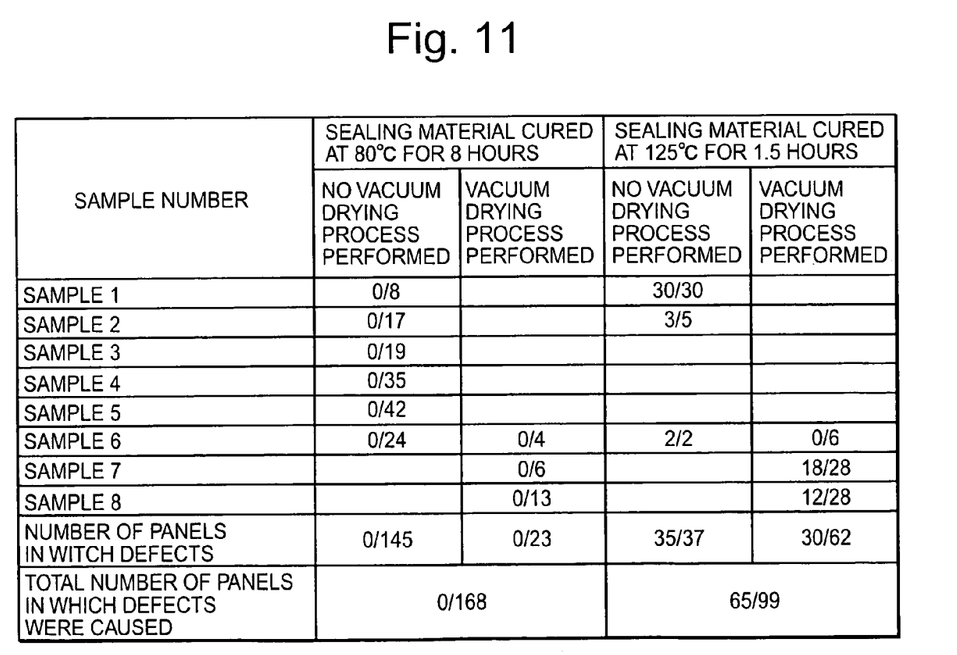
FIG. 11 is another table confirming effects to be brought about by the manufacturing method according to the second embodiment of the present invention.

As shown in FIG. 11, a larger number of visible defects was caused in each sample of sealing material 6 which had been cured at a temperature of 125° C., whether or not the vacuum drying process had been performed on the sample. By contrast, no visible defect was caused in each sample of sealing material 6 which had been cured at a temperature of 80° C., whether or not the vacuum drying process had been performed on the sample. Though this observation, it has been confirmed that the number of visible defects is reduced by lowering the temperature at which the sealing material 6 is completely cured. In addition, under a condition where the curing temperature was set at 80° C., no visible defect was caused, whether or not the vacuum drying process had been performed. Furthermore, no visible defect was not caused in any one of the samples (23 samples) on which the vacuum drying process had been performed. By this, visible defects would be able to be prevented almost completely by lowering the temperature at which the complete curing is performed and by concurrently performing the vacuum drying process.

It is obviously understood that each of the aforementioned embodiments can be applied to an arbitrary liquid crystal display panel having a structure which causes the two facing substrates to interpose liquid crystal therebetween. It is also clearly understood that each of the aforementioned embodiments can be applied to any type of liquid crystal display panel such as a TN mode LCD which causes a transparent electrode to be provided to each of the two substrate, and which drives the liquid crystal by use of an electric field in the vertical direction between the substrates, as well as an IPS mode LCD which causes comb-shaped electrodes to be provided to one of the two substrates, and which drives the liquid crystal by use of an electric field between the comb-shaped electrodes.

As described above, the method of manufacturing an LCD using the normal-pressure dispensation alignment method according to the present invention brings about the following effects.

A first effect of the present invention is that deterioration in reliability of the panel such as fluctuation in electric potentials of the respective common electrodes and stain in a periphery of the LCD can be inhibited so that visible defects such as bright defects can be reduce, thereby improving the yields.

The reason for the first effect is that contaminant particles (inorganic ions and dust including organic matters, residues such as waste pieces of thread of buff cloth and shavings of the alignment layers, coagulations of spacers, and the like) which have stuck to the substrates can be removed securely by performing the vacuum drying processes as well as any one of the suction process and the ultrasonic wave air flow blasting process. The vacuum drying processes for heating the respective substrates in a predetermined low-pressure atmosphere are performed after the cleaning step and the drying step posterior to the forming of the alignment layers, and before the writing with sealing material or before the spraying of spacers. The suction processes by use of a suction machine having a nozzle with a specialized shape such as a vacuum cleaner are performed respectively on the substrates after the writing with sealing material or after the spraying of spacers, and before the dispensing of liquid crystal. The ultrasonic wave air flow blowing process by use of a machine, such as a US cleaner, for blowing air flow to which ultrasonic waves have been applied against the samples are performed on the respective substrates after the writing with sealing material or after the spraying of spacers and before the dispensing of liquid crystal.

Furthermore, a second effect of the present invention is that visible defects such as alignment bright defects can be reduced so that the yields can be improved.

The reason for the second effect is that the temperature which completely hardens the sealing material is set to be as low as possible with reference to the reaction temperature of the polymerization of the sealing material and the phase transition temperature of the liquid crystal so that organic matters which have been formed on the substrates can be inhibited from being activated (migrated)

It is apparent that the present invention is not limited to the above embodiments, but may be modified and changed without departing from the scope and spirit of the invention.

What is claimed is:

1. A method of manufacturing a liquid crystal display device, comprising the steps of:
   preparing a pair of substrates on which alignment layers for liquid crystal display have been formed respectively;
   performing a rubbing process on each of the alignment layers of the pair of substrates;
   cleaning and drying each of the pair of substrates on which the rubbing process has been performed (hereinafter referred to as a "cleaning and drying step");
   removing contaminants on the surfaces of the respective alignment layers immediately after the cleaning and drying by performing a heated vacuum drying process for heating the pair of substrates at 100° C. or more in a low-pressure atmosphere of 1 Pa or less (hereinafter referred to as "contaminant removing step");
   spraying spacers onto the other of the pair of substrates and fixing said spacers thereon;
   performing further contaminant removing steps by a suction process for sucking up contaminants on the pair of substrates by use of air flow to be generated in the vicinity of the edge of a nozzle having a specialized shape by reducing a pressure within the nozzle, and by a blowing process for removing contaminants on the pair of substrates by blowing air flow to which ultrasonic waves have been applied, and thereby securely removing rubbing residues and coagulations of spacers;
   dispensing liquid crystal on the alignment layer of one of the pair of substrates on which the contaminant removing step has been performed (hereinafter referred to as a "liquid crystal dispensing step"); and
   arranging the pair of substrates to face each other, and bonding the substrates by using sealing material after the liquid crystal dispensing step.

2. The method of manufacturing a liquid crystal display device according to claim 1, wherein a process for curing the sealing material includes a temporary curing process to be carried out immediately after the pair of substrates subjected to the heated vacuum drying process are bonded, and a complete curing process to be performed after a desired gap is formed between the pair of substrates, and the complete curing process is performed at a temperature equal to or lower than phase transition temperature of the liquid crystal.

* * * * *